(12) United States Patent
Zhao et al.

(10) Patent No.: US 12,277,451 B2
(45) Date of Patent: Apr. 15, 2025

(54) DYNAMIC GPU-ENABLED VIRTUAL MACHINE PROVISIONING ACROSS CLOUD PROVIDERS

(71) Applicant: Omnissa, LLC, Mountain View, CA (US)

(72) Inventors: Sam Zhao, Beijing (CN); Bomin Nie, Beijing (CN); Nan Wang, Beijing (CN); Jingtao Zhang, Beijing (CN); Zhifu Jin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 465 days.

(21) Appl. No.: 17/676,397

(22) Filed: Feb. 21, 2022

(65) Prior Publication Data

US 2023/0236902 A1    Jul. 27, 2023

(30) Foreign Application Priority Data

Jan. 21, 2022   (WO) ................ PCT/CN2022/073240

(51) Int. Cl.
*G06F 9/50* (2006.01)
*G06N 20/00* (2019.01)

(52) U.S. Cl.
CPC .......... *G06F 9/5077* (2013.01); *G06F 9/5016* (2013.01); *G06F 9/5033* (2013.01); *G06F 9/5083* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,904,974 B2 * | 2/2018 | Wilt | G06F 9/5077 |
| 10,176,550 B1 * | 1/2019 | Baggerman | G06T 1/60 |
| 10,572,292 B2 * | 2/2020 | Bhandari | G06F 9/455 |
| 10,680,969 B1 * | 6/2020 | Quinn | G06F 9/45558 |
| 10,789,668 B2 * | 9/2020 | Tunuguntla | G06F 9/5077 |
| 11,113,782 B2 * | 9/2021 | Prakash | G06T 1/20 |
| 11,422,863 B2 * | 8/2022 | Sengupta | G06F 9/5022 |
| 2018/0060996 A1 * | 3/2018 | Tunuguntla | G06F 9/45558 |
| 2020/0004597 A1 * | 1/2020 | Sengupta | G06N 3/08 |

* cited by examiner

*Primary Examiner* — Van H Nguyen
(74) *Attorney, Agent, or Firm* — Kim & Stewart LLP

(57) ABSTRACT

A method of provisioning virtual machines (VMs) includes: providing a VM pool that includes a graphics processing unit (GPU)-optimized VM and a non-GPU-optimized VM operating in different clouds. A control plane can receive an indication that a user has submitted a workload request, determine whether a GPU-optimized VM is available and instruct the non-GPU-optimized VM to send the workload to the GPU-optimized VM in a peer-to-peer manner. The GPU-optimized VM computes the workload and returns a result to the requesting VM. The control plane can instantiate a new GPU-optimized VM (or terminate it when the workload is complete) to dynamically maintain a desired number of available GPU-optimized VMs.

18 Claims, 6 Drawing Sheets

DYNAMIC GPU-ENABLED VIRTUAL MACHINE PROVISIONING ACROSS CLOUD PROVIDERS

BACKGROUND

As machine learning and other computationally intensive techniques increasingly proliferate the workplace, computing demands continue to increase accordingly. These types of computing demands are best suited for computing devices with access to graphics processing units ("GPUs") because of their ability to rapidly manipulate and alter data. As a result, the demand for GPU-enabled devices continue to increase, particularly in scenarios where machine-learning workloads are frequently utilized.

However, GPUs are quite expensive relative to other computing hardware, particularly due to the increased demand for GPUs from high-end gaming and cryptocurrency mining. For cost-saving purposes, an enterprise is unlikely to provision GPU-equipped devices to all the employees that might benefit from them. This is because a GPU-equipped device, even if utilized frequently by an employee, would likely spend most of its time idle. As a result, an enterprise would prefer to purchase fewer GPUs and utilize them more extensively in order to save costs.

Effectively utilizing GPU-equipped devices across multiple employees is challenging. One way to facilitate more efficient GPU use is to provide virtual machines ("VMs") that are GPU-enabled (referred to herein as "GPU VMs") and that an employee can utilize to complete a workload. For example, a user can utilize virtual desktop infrastructure ("VDI") technology to log in to a virtual desktop associated with a GPU VM and perform a machine learning workload that utilizes the GPU associated with the GPU VM. When that user is finished with the machine learning project, he or she could move to a non-GPU VM and leave the GPU VM free for another employee to use. This would save costs, as GPU VMs are considerably more expensive to run than non-GPU VMs. However, this system still suffers from inefficiencies in that employees are required to manage their use of GPU VMs versus non-GPU VMs and spend time switching between the two.

In light of these drawbacks, many enterprises would benefit from an automated system that provisions GPU VMs on demand to employees that need them, without interrupting the employee's ongoing work on a different, non-GPU VM. But this goal is further complicated by the fact that, increasingly, enterprises use VDI desktop pools that span multiple cloud providers. In other words, a single enterprise can have a VM pool that includes VMs running on separate clouds (e.g., AZURE, AWS, GOOGLE). These cloud service providers do not communicate seamlessly with each other in a manner that would facilitate efficient handoffs between users. For example, each cloud service may utilize one or more hypervisors that manage VMs within that cloud service, but not other cloud services. This presents problems when an employee is utilizing a non-GPU VM on one cloud service provider but wants to run a machine learning workload that would benefit from a GPU VM provided by a different cloud service provider.

No mechanism currently exists for seamlessly provisioning GPU VMs across cloud service providers in this manner. As a result, a need exists for systems and methods that facilitate dynamic VM provisioning across different cloud providers in a manner that provides for seamless integration of GPU VMs.

SUMMARY

Examples described herein include systems and methods for dynamic VM provisioning across cloud service providers. An example method can include providing a VM pool that includes at least one GPU VM and at least one non-GPU VM. The GPU VM can be any VM that has access to a GPU, such that the VM can utilize the GPU to perform at least some computing tasks. The non-GPU VM can be any VM that does not have access to a GPU for computing tasks. The VM pool can be any group of VMs, such as a group of VMs made available for use by the same tenant (e.g., an enterprise using the VMs). The VM pool can include VMs provided by different cloud service providers, and in some examples the cloud service providers are not aware of VMs in the VM pool that are provided by another cloud service provider.

The example method can also include receiving, at a control plane for the VM pool, an indication that a user has submitted a machine-learning workload request through a non-GPU VM. The control plane can be provided in a VDI control layer in some examples. In other examples, the control plane can be a local control plane that executes on one or more VMs, including GPU VMs. In either case, the control plane can receive an indication that a user has submitted a machine-learning workload request. The request can originate from a non-GPU VM in some examples. For instance, the user can utilize software that allows a user to make a computation request. When a user makes the request, the software can cause the non-GPU VM to contact the control plane to request workload acceleration from a GPU VM.

The example method can further include determining, by the control plane, that a GPU VM is available. In some examples, this can include determining that the GPU VM does not have a user logged in. In other examples, this can include determining that the GPU VM is not processing any GPU-relevant workloads. The GPU VM can reside in a different cloud than the non-GPU VM in some examples.

Assuming a GPU VM is available for use, the example method can further include instructing the non-GPU VM to send the workload request to the first GPU VM. For example, the non-GPU VM can communicate with the GPU VM using a peer-to-peer communication scheme to request specific processing by the GPU associated with the GPU VM. In some examples, the GPU VM can provide an indication to the control plane that the GPU VM is currently in use.

The example method can also include the control plane causing a second GPU VM to be instantiated in the VM pool. This can be performed in an effort to maintain a minimum number of GPU VMs free and available for use at any given time. Similarly, the example method can include receiving an indication at the control plane that the machine-learning workload request is complete, determining that the GPU VM is available for use, and causing a GPU VM to shut down. In this example, the control plane can ensure that a minimum number of GPU VMs remain free, but that the number of free GPU VMs does not exceed a certain number. In some examples, the control plane can maintain a precise number of available GPU VMs. In other examples, the control plane can utilize minimum and maximum numbers to determine when to instantiate or terminate a VM. In some examples, the control plane performs this functionality without communicating with a hypervisor associated with any of the VMs involved.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
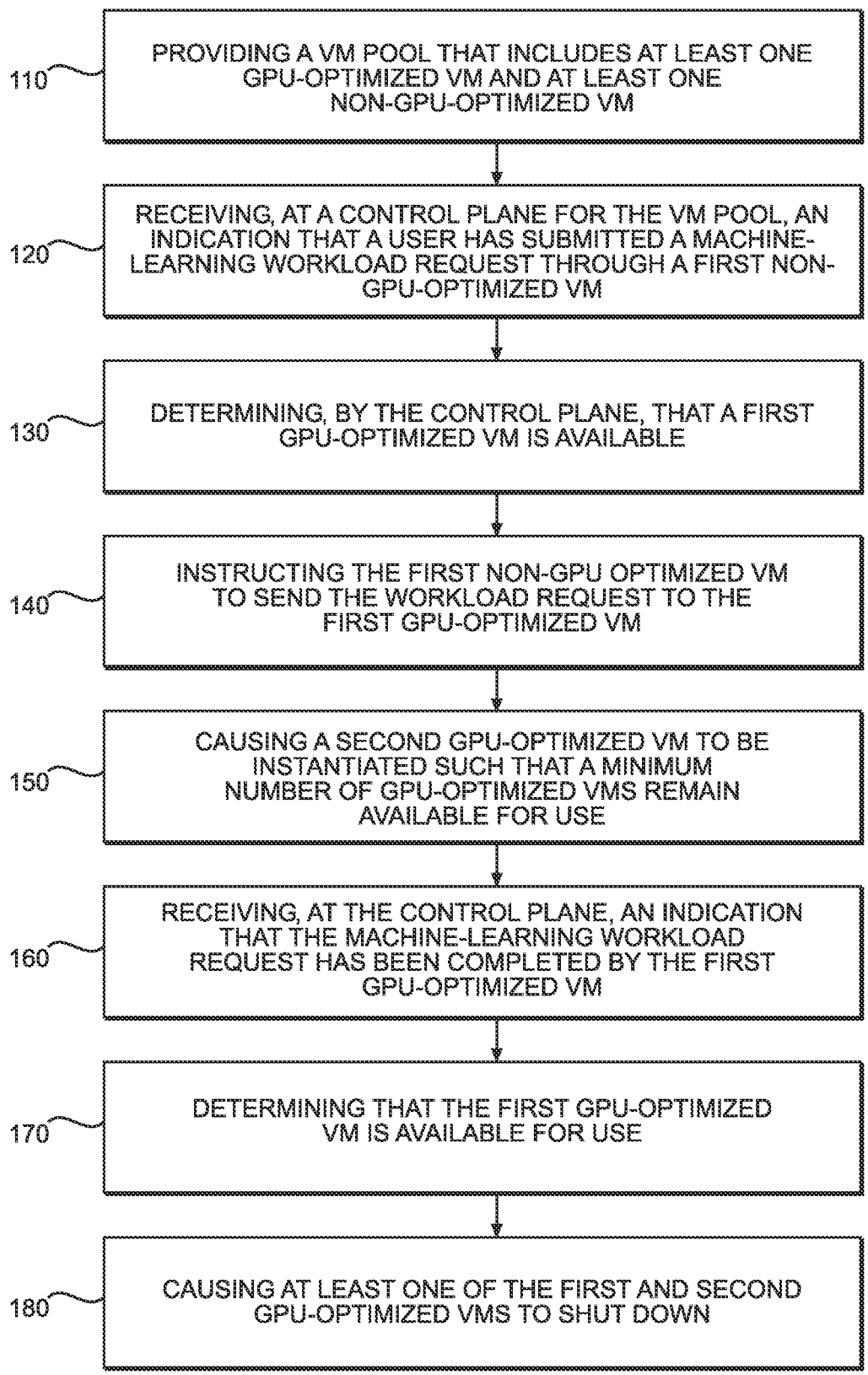
FIG. 1 is a flowchart of an example method for dynamic VVI provisioning across cloud service providers.

FIG. 1 is a flowchart of an example method for dynamic VM provisioning across cloud service providers. Stage 110 of the example method can include providing a VM pool that includes at least one GPU-optimized VM and at least one non-GPU-optimized VM. As used herein, a GPU-optimized VM can be any VM that has access to a GPU and is capable of utilizing it in some way. For example, a GPU-optimized VM can execute on a processor-based computing device, such as a server with a physical processor, that includes a GPU that the VM is authorized to use. The terms "GPU-optimized VM" and "GPU VM" are used interchangeably throughout this disclosure.

Similarly, a non-GPU-optimized VM can be any VM that does not have access to a GPU. This can include a VM executing on a processor-based computing device that lacks a GPU in one example. In another example, a non-GPU-optimized VM can be a VM executing on a processor-based computing device that includes a GPU that the VM is not authorized to access. In other examples, a non-GPU-optimized VM can include a VM that lacks proper authorization (such as a license) to use a GPU. The terms "non-GPU-optimized VM" and "non-GPU VM" are used interchangeably throughout this disclosure.

The at least one GPU VM and one non-GPU VM can be part of a VM pool that is provided by one or more service providers, such as through use of an orchestrator or other processes that manage VMs on hypervisors. In some examples, the VM pool is created by a control plane. A control plane can be any script, code, module, or device, or combination thereof, that provides management and orchestration across a cloud environment. In some examples, a control plane can provision user roles and user access, cause the instantiation and termination of VMs, provision applications to VMs or other entities, push software updates, and perform any other tasks relevant to controlling one or more server clouds. A control plane can also instruct other devices or modules to perform some or all of these tasks. As an example, a control plane can instruct a Lifecycle Management module to update an old VM or terminate the old VM and instantiate a new, updated VM in its place.

In the example of FIG. 1, the control plane can create the VM pool based on receiving instructions from an administrator. Based on receiving those instructions, the control plane can instruct a cloud service provider to establish a VM pool or otherwise provide access to an existing VM pool. At stage 110, the control plane can instruct a single cloud service provider to provide a VM pool. In some examples, however, this stage can include the control plane instructing multiple cloud providers to each provide a separate VM pool. In some examples, the control plane performs this stage by interacting with one or more hypervisors associated with the relevant cloud service providers.

The control plane can be configured to receive data from any of the VMs in the VM pool. For example, at stage 120, the control plane can receive an indication that a user has submitted a machine-learning workload request through a first non-GPU VM. Although the term "machine-learning workload" is used throughout this disclosure, the workload could be any computationally intensive workload, such as artificial intelligence workloads, and is not intended to be limited to a particular definition of "machine-learning." In an example, a user can be logged into a virtual desktop on the non-GPU VM performing a work-related task that involves substantial computation for at least one stage of the task.

In some examples, the application recognizes a computationally intensive workload and prompts the user to accelerate the workload by utilizing a remote GPU. In another example, the user manually selects a workload and requests acceleration by a remote GPU. In yet another example, the user's application automatically identifies and submits a machine-learning workload to the control plane without the user being involved.

At stage 130, the control plane can determine whether a GPU VM is available. This stage can include querying the relevant GPU VMs, such as by using an application programming interface ("API") call, requesting a status of the GPU VM or the GPU itself. In some examples, a GPU VM is available if it is not being used at all—for example, with no user logged in to a desktop associated with the GPU VM. In other examples, a GPU VM is available if the GPU is not currently in use regardless of whether a user is logged in to a desktop associated with the GPU VM. In yet another example, the control plane maintains a use record for each GPU VM. In that example, each GPU VM checks in with the control plane when in use and checks out when the use is completed. Using any or all of these techniques at stage 130, the control plane determines which GPU VMs, if any, are available.

If at least one GPU VM is available, then at stage 140 the control plane instructs the non-GPU VM to send the workload request to the GPU VM. The instruction can be provided directly to the non-GPU VM, such as by using an API call, and can instruct the non-GPU VM to communicate with the GPU VM in a peer-to-peer manner. As explained in more detail with respect to FIG. 3, the VMs can communicate with each other using a peer-to-peer layer that includes a virtual GPU client on the sending VM and a virtual GPU server on the receiving VM. In an example, the non-GPU VM formats the workload to a GPU-accessible form before transmission to the GPU VM.

At stage 150, the control plane can cause a second GPU VM to be instantiated in the VM pool. For example, the control plane can instruct the cloud service provider to instantiate the new VM according to specifications associated with a GPU VM. The control plane can follow one or more rules in a profile that dictate when a new GPU VM should be instantiated or terminated. In one example, a profile indicates that a particular number of GPU VMs should be free at any given time. In that example, when GPU VM becomes occupied with a new workload, the control plane instantiates a new GPU VM. Similarly, when the GPU VM indicates that the workload is complete, the control plane terminates that GPU VM (or a different GPU VM) to maintain the desired number. In another example, the profile provides a range of free GPU VMs to be maintained, such as a minimum of 5 and a maximum of 15. Whenever the number of free GPU VMs exceeds this range on either end, the control plane can take appropriate actions to return the number of free GPU VMs within the accepted range.

At stage 160, the control plane can receive an indication that the machine-learning workload request has been completed by the GPU VM. This can include, for example, receiving data at the control plane from the GPU VM that just completed the workload. In another example, this stage can include receiving data at the control plane from the non-GPU VM that requested the work, indicating that the workload has been completed and returned.

At stage 170, the control plane can determine that the GPU VM is available for further use. In some examples, this stage can be performed by the same actions performing stage 160—for example, an indication from a GPU VM that the workload has been completed at stage 160 can also function to indicate that the GPU VM is free for use. In another example, stage 170 can include further checks, such as determining whether a user is logged in to a desktop associated with the GPU VM. In yet another example, the control plane can determine whether the GPU VM is still online and up to date. For security purposes, the control plane can cause the GPU VM to perform an additional authentication in some examples.

At stage 180, having determined at stage 170 that the GPU VM is available for use, the control plane can cause at least one of the first GPU VM and the second GPU VM to shut down. In one example, this stage is performed according to the relevant rules in the profile stored at the control plane, such as a rule instructing the control plane to maintain a specific number of available GPU VMs. In that example, an additional GPU VM was created for the workload and, assuming no other changes to other GPU VMs in the pool, when the first GPU VM finished its workflow, the total number of GPU VMs was above the target number. As a result, in that example, the control plane would instruct at least one of the GPU VMs to shut down.

The control plane can determine which GPU VM to shut down in this example based on rules, such as another rule in the profile. For example, the profile can include a rule that older GPU VMs should be terminated before younger GPU VMs. In that case, the first GPU VM would be instructed to shut down while the second GPU VM would remain available for use. Other rules can be used for this decision, such as shutting down the cheaper-to-run GPU VM, if one exists. Another example rule is to shut down GPU VMs according to an ordered list of cloud service providers, such that AMAZON WEB SERVICE ("AWS") VMs should be shut down before AZURE VMs. Any other such rule can be used at stage 180.

Figure 2:
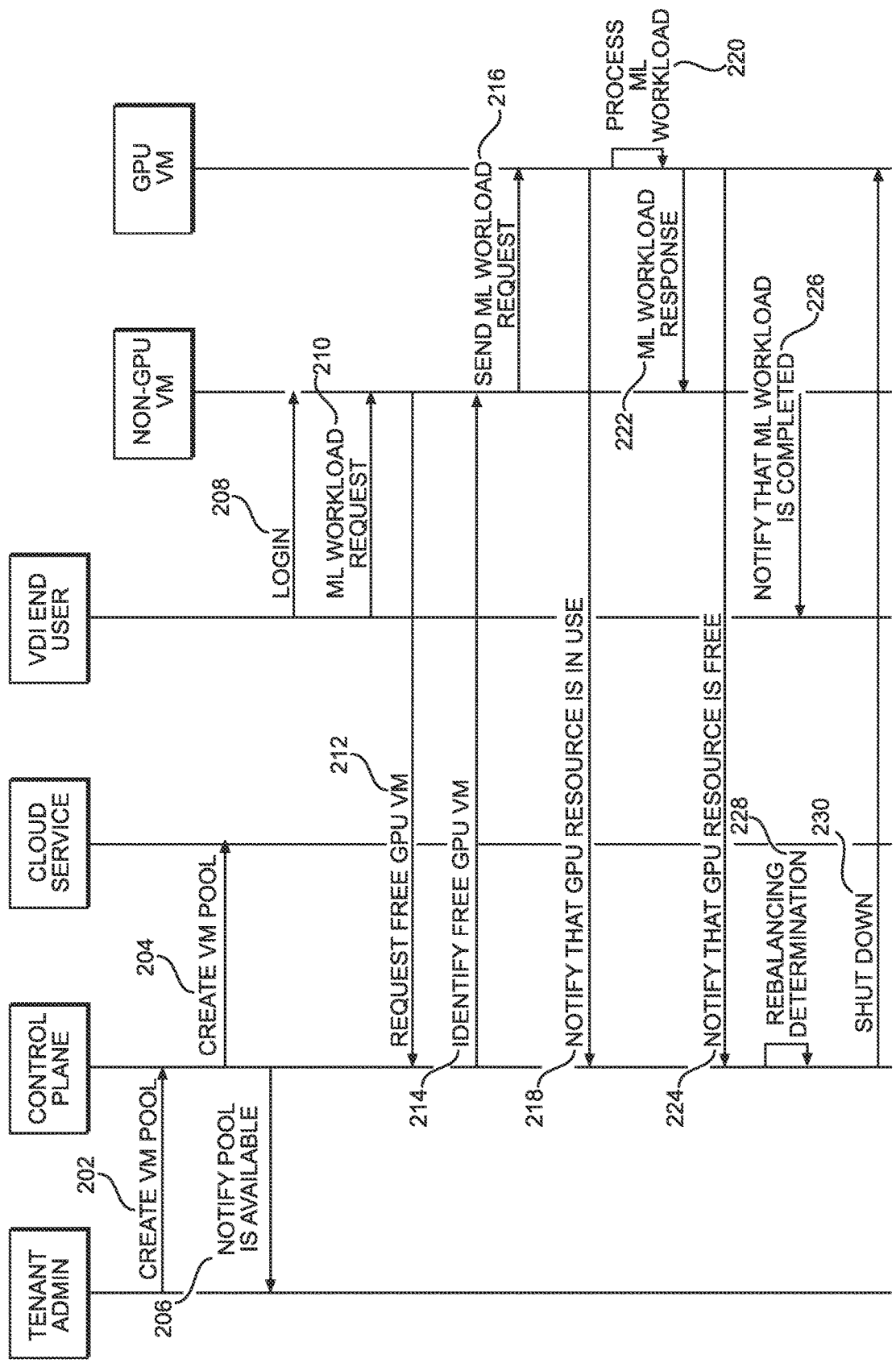
FIG. 2 is a sequence diagram of an example method for dynamic VM provisioning across cloud service providers.

FIG. 2 provides a sequence diagram of an example method for dynamic VM provisioning across cloud service providers, providing more detail for the example described with respect to FIG. 1. At stage 202, a tenant administrator can request that a control plane create a VM pool, also referred to as a desktop pool herein. The request can be provided through a graphical user interface ("GUI") configured to interface with the control plane in some examples. For example, the request can be made through a vSPHERE BITFUSION CLIENT, or any other client with similar functionality, installed on a computing device accessible by the tenant administrator. In some examples, the client is an elastic GPU management module, as described in FIG. 4. In some examples, the client is installed on a GPU VM. In those examples, the client can function as a local control plane. In other examples, the client is installed on a VDI control plane that can include other control mechanisms describe with respect to FIGS. 4 and 5.

A control plane can be any script, code, module, or device, or combination thereof, that provides management and orchestration across a cloud environment. In some examples, a control plane can provision user roles and user access, cause the instantiation and termination of VMs, provision applications to VMs or other entities, push software updates, and perform any other tasks relevant to controlling one or more server clouds. A control plane can also instruct other devices or modules to perform some or all of these tasks. As an example, a control plane can instruct a Lifecycle Management module to update an old VM or terminate the old VM and instantiate a new, updated VM in its place. As another example, a control plane can instruct an image service to provide a VM image to a newly instantiated VM. The Lifecycle Management module and image service can be part of the control plane in some examples, and are described in more detail with respect to FIGS. 4 and 5.

The instructions at stage 202 can include instructions regarding the number of VMs to instantiate, the types of VMs to instantiate, and any applicable rules for dynamically maintaining an available pool of VMs. For example, the instructions can specify that the VM pool should include 100 non-GPU VMs and ten GPU VMs. The instructions can also identify specifications associated with the different types of VMs, such as that the GPU VMs should include access to a GPU having at least 4 GB of graphics memory. Additionally, the instructions can identify one or more cloud service providers and can specify a cloud service provider for each VM or type of VM. By way of example, the instructions can specify that the non-GPU VMs are to be provided by GOOGLE, five GPU VMs are to be provided by AWS, and five GPU VMs are to be provided by AZURE.

In some examples, the instructions can include a profile with rules to be implemented by the control plane, regardless of whether the control plane is a local control plane hosted on a GPU VM or a VDI-layer control plane. The profile can include instructions for managing the VM pool, such as by setting rules for dynamically maintaining a pool of available GPU VMs. In one example, the profile provides a target number of available GPU VMs to maintain, such as ten, although any number can be selected. When the number of available GPU VMs drops below the target, the rule can cause the control plane to instantiate one or more new GPU VMs to reach the target. Similarly, when the number of available GPU VMs exceeds the target, the rule can cause the control plane to terminate one or more new GPU VMs to reach the target.

In some examples, the rule provides a target number of available GPU VMs but also includes an acceptable deviation from the target, such as a range of numbers. As an example, the profile can establish a target of ten available GPU VMs, but also include a rule that plus or minus two GPU VMs is acceptable. Said a different way, the rule can indicate that eight to twelve available GPU VMs is acceptable. In that example, if the number of available GPU VMs drops below eight or exceeds twelve, the control plane can take action to return the number of available GPU VMs to the target of ten.

In some examples, the administrator can manually select the target number of GPU VMs and any acceptable range surrounding that target, as described above. In another example, however, the target number or the acceptable range, or both, can be automatically determined using historical data. The determination can be made by the control plane, by the client associated with the GUI that the administrator is using, or by some other script or application. In some examples, the determination is based on historical usage of GPU VMs. The determination can analyze the history of GPU VM usage and determine one or more patterns or trends. As an example, the determination can include that GPU VM usage has increased each month by an average of 0.5 GPU VMs per month over the past year. Further, the determination can include that GPU VM usage drops over the weekend and increases during the week. Based on some or all of these determinations, future GPU VM usage can be extrapolated and used to select a target number. The extrapolation can also account for the decommissioning of existing VM pools, if applicable.

To provide further example numbers, the control plane or client can determine that two VM pools exist, with each VM pool providing five GPU VMs. The determination can include that GPU VM usage has increased each month by an average of 0.5 GPU VMs per month, with the current average being 9.5 GPU VMs used per weekday. The determination can also include that GPU VM usage decreases over the weekend to approximately 2.5 GPU VMs used per day. Finally, the determination can include that one of the two existing VM pools will be decommissioned within the next week. Based on all these determinations, the control plane or client can determine that capacity for ten additional GPU VMs should be added to make up for the five soon-to-be-decommissioned GPU VMs and the extrapolated future need for GPU VMs over the next year based on the 0.5 monthly increasing average. Finally, the control plane or client can determine that weekend capacity requires only five, rather than ten, additional GPU VMs to be available.

In this example, the profile can be created or modified to include rules regarding dynamically changing the size of the GPU VM pool based on time, such as based on the day of the week. Continuing the example above, the profile can include a rule that during work hours on Monday-Friday, the control plane should target ten available GPU VMs with an acceptable range of eight to twelve available GPU VMs. The profile can also include a rule that during off hours not falling within the work hours on Monday-Friday, the control plane should target five available GPU VMs with an acceptable range of three to seven available GPU VMs.

At stage 204, the control plane can create a VM pool based on the instructions received at stage 202, such as instructions contained within a profile as described above. Using these instructions, the control plane can contact one or more cloud service providers to create the VM pool. Although stage 204 is described herein as "creating" a VM pool, this stage can additionally or alternatively include modifying an existing VM pool, such as by adding or subtracting VMs to the pool. In one example, this stage includes instructing one cloud service provider to create a new VM pool while instructing a second cloud service provider to expand an existing VM pool. At stage 206, the control plane can notify the tenant administrator that the requested VM pool is available for use.

At stage 208, a VDI end user can login to a virtual desktop associated with a non-GPU VM. This stage can be performed by the user providing credentials, such as a username and password, a single-sign-on ("SSO") credential, a certificate, or a token, for example. The user can then utilize the virtual desktop as needed, such as by accessing email, enterprise applications, web browsers, and any other tools provided by the virtual desktop.

At stage 210, the VDI end user can submit a machine learning workload request through the virtual desktop of the non-GPU VM. As mentioned above, this workload request need not be limited to machine learning, but can instead be any computationally intensive workload, such as an artificial intelligence workload. The user can submit the workload request in a variety of manners. In one example, an application executing on the non-GPU VM recognizes a computationally intensive workload and prompts the user to accelerate the workload by utilizing a remote GPU. In this example, the application can be the same application in which the workload originates or is requested. In another example, the application is a standalone application that monitors for sufficiently heavy workloads and provides the prompt to the virtual desktop user.

In another example, the user manually selects a workload and requests acceleration by a remote GPU. For example, the user can utilize a dedicated application that includes an interface for uploading one or more files or for providing an identification of a storage location that contains the relevant files. The dedicated application can also be configured to interface with the application from which the workload originates. For example, the user can select a pulldown menu within the originating application and select an option for exporting a workload to a remote GPU using a different application. In yet another example, the user's application automatically identifies and submits a machine-learning workload to the control plane without the user being involved. In other examples, an operating system associated with the virtual desktop can perform some or all of the application-level functionality described above with respect to this stage.

After receiving the workload request at stage 210, the non-GPU VM can request identification of an available GPU VM from the control plane at stage 212. In some examples, this stage includes making an API call to the control plane, to which the control plane can respond by providing a list available GPU VMs at stage 214. The identification at stage 214 can be based on a record file stored by the control plane that maintains a record of the availability status of each GPU VM. The availability status can be based on information provided by each GPU VM, such as indications that each GPU VM is busy or not busy.

The availability status can be updated before communicating with the non-GPU VM at stage 214. For example, the control plane can query each GPU VM to confirm whether each is in use or available for use. In some examples, a GPU VM is available when the GPU associated with the GPU VM is not being used. In other examples, a GPU VM is available when the GPU associated with the GPU VM is not being used and no users are logged in to a virtual desktop associated with the GPU VM. Stage 214 can include sending a list of available GPU VMs to the non-GPU VM, including information sufficient to allow the non-GPU VM to connect to the available GPU VMs. In some examples, the control plane selects one particular GPU VM and provides the associated information for that GPU VM to the non-GPU VM at stage 214.

At stage 216, the non-GPU VM can send the workload request to one of the GPU VMs identified by the control plane at stage 214. As explained in more detail with respect to FIG. 3, the VMs can communicate with each other using a peer-to-peer layer that includes a virtual GPU client on the sending VM and a virtual GPU server on the receiving VM. In an example, the non-GPU VM formats the workload to a GPU-accessible form before transmission to the GPU VM.

At stage 218, the GPU VM can notify the control plane that the GPU resource is in use, based on receiving the workload request at stage 216. This can be an API call made to the control plane in some examples, though any notification procedure can be used. The control plane can update its records accordingly, such that the record reflects that the GPU VM is currently in use. In this manner, the control plane will not direct further workload requests to the busy GPU VM and instead can direct those requests to other, available GPU VMs.

At stage 220, the GPU VM can process the workload using the GPU to accelerate the processing. As explained in more detail with respect to FIG. 3, processing the workload can include receiving the workload at a virtual GPU server of the GPU VM, interpreting an API request payload to a graphics driver API, and then calling GPU resources to run the computing. Once the computing is completed, the virtual GPU server of the GPU VM can provide a workload response to the non-GPU VM at stage 222. For example, the virtual GPU server of the GPU VM can send the results of the workload to a virtual GPU client of the non-GPU VM at this stage. As part of stage 222, the non-GPU VM can receive the workload response and pass the result to the relevant application executing on the non-GPU VM.

At stage 224, the GPU VM can notify the control plane that it is now free and available for use. The control plane can update its stored record of GPU VM statuses to indicate that the relevant GPU VM is now available for use. Similarly, at stage 226, the non-GPU VM can notify the VDI end user that the workload is complete. In some examples, stage 226 can occur before stage 224, while in other examples the stages can occur simultaneously.

At stage 228, the control plane can determine whether to rebalance the number of GPU VMs based on the current number of available GPU VMs. The determination can be made based on the instructions in the profile provided to the control plane at stage 202. As described above with respect to stage 202, the profile can provide a target number of available GPU VMs as well as an acceptable range of deviation. At stage 228, the control plane can apply that rule to the current number of available GPU VMs. In the example of FIG. 2, the control plane determines that the current number of available GPU VMs exceeds an allowable number. For example, the target number can be ten, with an acceptable range of eight to twelve, but with a current number of available GPU VMs being thirteen.

Because the number of available GPU VMs exceeds the allowed amount in this example, the control plane can take action to shut down one or more GPU VMs. For example, at stage 230, the control plane can instruct the GPU VM to shut down. With a target of ten in this example, the control plane can also instruct two other GPU VMs to shut down, bringing the total number of available GPU VMs back to ten. In one example, the control plane can shut down the GPU VMs sequentially and after a preset period of non-use. This can prevent shutting down a GPU VM only to need to re-instantiate it moments later.

Figure 3:
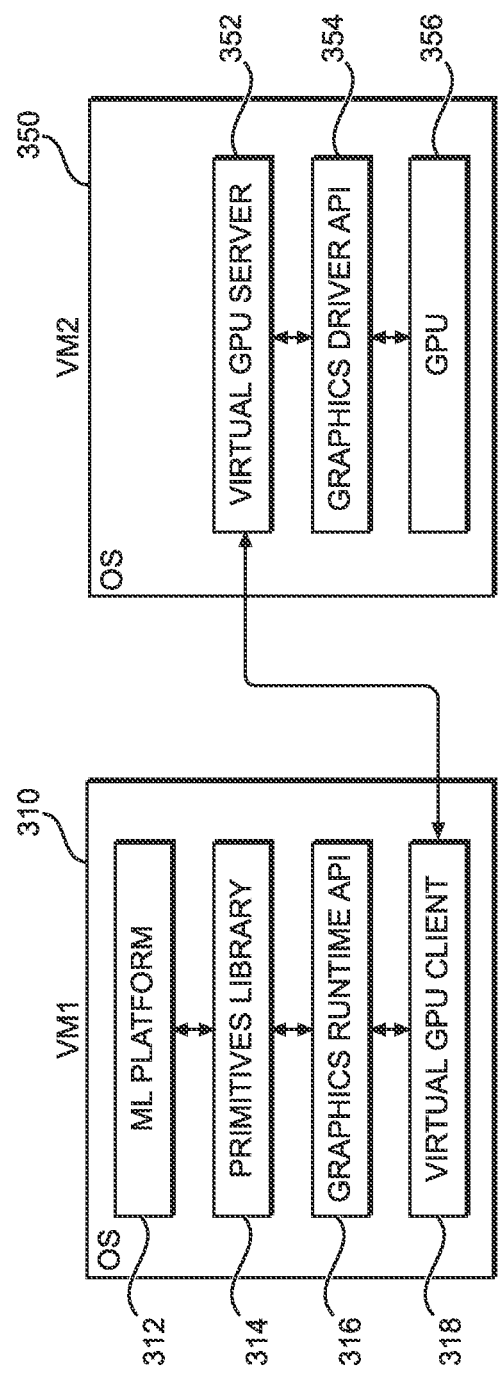
FIG. 3 is an illustration of an example system for peer-to-peer VM utilization between two VMs, for use in dynamically provisioning VMs across cloud service providers.

FIG. 3 provides an illustration of an example system for peer-to-peer VM utilization between two VMs, for use in dynamically provisioning VMs across cloud service providers. This peer-to-peer layer can be used to transfer machine-learning workloads between VMs, as described above in stages 216 and 222 of FIG. 2. The peer-to-peer layer of FIG. 3 is optimized for GPU processing, allowing a first VM 310 to send a workload to a second VM 350 for remote GPU processing. In one example, the first VM 310 corresponds to a non-GPU VM while the second VM 350 corresponds to a GPU VM, but this arrangement could also be used such that both VMs 310, 350 correspond to GPU VMs. The communications between VMs 310, 350 can be performed securely, such as by using a secure tunnel connection, encryption, or other method of establishing secure communication channels between two VMs.

As shown in FIG. 3, the first VM 310 can include a machine-learning platform 312. Although described as a "machine-learning" platform, the platform 312 can be any parallel computing platform that allows software to use GPUs for general purpose processing. One example of such a platform is Compute Unified Device Architecture ("CUDA") developed by NVIDIA. The platform 312 can be a software layer that can provide access to a GPU's virtual instruction set and parallel computation elements for the execution of compute kernels.

The platform 312 can also include a software library relevant to machine learning and artificial intelligence. The library can include a collection of non-volatile resources used by GPU-related programs, including configuration data, documentation, help data, classes, values, specifications, and pre-written code and subroutines, for example. An example of an open-source library for machine learning and artificial intelligence is TENSORFLOW, which can be included in platform 312 in an example.

The first VM 310 can also include a primitives library 314. The primitives library 314 can be a deep neural network library, such as a GPU-accelerated library of primitives for deep neural networks. The primitives library 314 can provide highly tuned implementations for GPU-related routines. The use of the primitives library 314 can work with a deep learning framework, such as the platform 312, to provide GPU-related implementations that have already been tuned for performance with particular types of GPUs. An example of a primitives library 314 is NVIDIA cuDNN. As shown in FIG. 3, the platform 312 can communicate with the primitives library 314, such as by providing a request to use GPU acceleration on a particular workload.

The primitives library 314 can interface with a graphics runtime API 316 of the first VM 310. The graphics runtime API 316 can be an API designed to interpret the workload request that it receives from the platform 312 or primitives library 314. For example, the graphics runtime API 316 can include implicit initialization, context management, and module management for utilizing a GPU to perform processing acceleration. The graphics runtime API 316 can translate the workload request into a language that a GPU client can consume and can then forward the translated request to the virtual GPU client 318.

The virtual GPU client 318 can be a software client executing on the first VM 310 that facilitates communication between the first VM 310 and the second VM 350. For example, the virtual GPU client 318 can open a secure communication channel with a virtual GPU server 352 of the second VM 350. In some examples, a network location associated with the virtual GPU server 352 is provided to the first VM 310 by the control plane. For example, the control plane can provide this information as part of stage 214 described with respect to FIG. 2.

The virtual GPU server 352 of the second VM 350 can wait for a communication from a virtual GPU client. Once the workload is received at the virtual GPU server 352, the second VM 350 can interpret the API request payload from the virtual GPU client 318 using a graphics driver API 354. The graphics driver API 354 can be an API configured to interpret a workload request and translate it into specific instructions to be provided directly to a GPU 356. The graphics driver API 354 can include additional flexibility over the graphics runtime API 316, allowing the GPU 356 to process multiple workloads with precise context selection and management for the various associated requests sent to the GPU 356.

In some examples, the GPU 356 performs the processing and returns a result back to the virtual GPU server 352, either directly or by way of the graphics driver API 354 which can translate the results into a more usable format. The virtual GPU server 352 can then transmit these results back to the virtual GPU client 318 of the first VM 310. The virtual GPU client 318 can forward those results back to the platform 312, either directly or by way of the graphics runtime API, depending on what the platform 312 requires to interpret the results. In this manner, the first VM 310 and second VM 350 can establish a peer-to-peer layer where the VMs 310, 350 communicate directly with one another to provide remote GPU processing.

Figure 4:
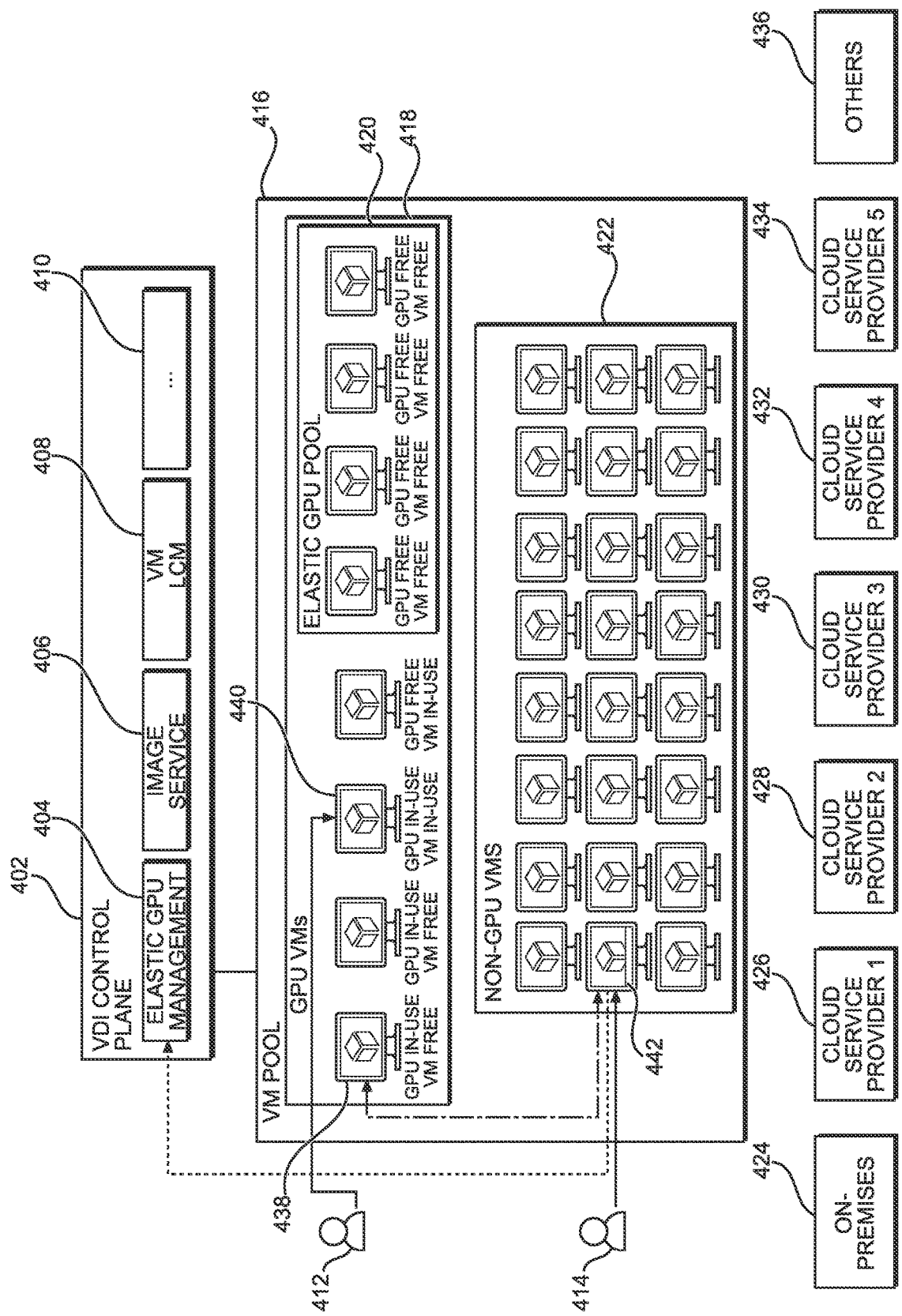
FIG. 4 is an illustration of an example system for dynamic VM provisioning across cloud service providers using a VDI control plane.

FIG. 4 provides an illustration of an example system for dynamic VM provisioning across cloud service providers using a VDI control plane. The example system includes a VDI control plane 402 with various software modules. For example, the VDI control plane 402 includes an elastic GPU management module 404, which can be a software module that performs various GPU management tasks. For example, the elastic GPU management module 404 can perform stages 204 and 214 of FIG. 2, relating to creating a desktop pool and identifying available GPU VMs. The elastic GPU management module 404 can also create, store, and update a record reflecting the current status of each GPU VM in order to properly identify an available GPU VM when needed. The elastic GPU management module 404 can also communicate with a cloud service provider to request more or fewer VMs, to obtain or change licenses for VMs, or to make any other relevant changes.

The elastic GPU management module 404 can instruct other modules of the VDI control plane 402 as well. For example, the VDI control plane 402 can include an image service 406. The image service 406 can store and manage images to be applied to newly instantiated VMs. For example, when a new VM is instantiated, the image server 406 can determine which image should be loaded to that VM based on the type of VM and any instructions provided by the elastic GPU management module 404 or rules in a profile. The image server 406 can then provision the correct image to the newly instantiated VM.

The VDI control plane 402 can also include a VM lifecycle manager 408. The VM lifecycle manager 408 can manage updates and changes to the various VMs controlled by the VDI control plane 402. For example, the VM lifecycle manager 408 can instruct a VM to apply an upgrade, such as by updating a VM's operating system or application to a newer version. The VM lifecycle manager 408 can also coordinate the termination and re-instantiation of a VM if the VM's lifecycle has exceeded a threshold amount of time. The VDI control plane 402 can also include other modules 410, such as modules for interfacing with other systems.

The system of FIG. 4 also includes a VM pool 416. The VM pool 416 includes a GPU VM pool 418 and a non-GPU VM pool 422. As shown in the drawing, the GPU VM pool 418 includes two sets of GPU VMs, a first set with GPUs currently in use, and a second set with GPUs available for use. The GPU VMs with GPUs available for use are collectively referred to as an elastic GPU pool 420. In some examples, the VMs in the VM pool 416 are provided by a single cloud service provider. In other examples, the VMs in the VM pool 416 are provided by multiple different cloud service providers, such as any of cloud service providers 1-5 (426, 428, 430, 432, 434, 436). Additionally, some or all of the VMs can be provided using on-premises equipment 424.

FIG. 4 also shows a first user 412 and a second user 414. The arrows originating from these users 412, 414 indicates that the first user 412 is logged into a session on a GPU VM 440 while the second user 414 is logged into a session on a non-GPU VM 442. In this example, the second user 414 has requested workload acceleration using a remote GPU. Accordingly, the non-GPU VM 442 associated with that user 414 has contacted the elastic GPU management module 404, as indicated by the arrow between that module 404 and the VM 442. The communications between the elastic GPU management module 404 and the non-GPU VM 442 indicated by that arrow can be those described in stages 212 and 214 of the example method of FIG. 2, in an example.

FIG. 4 also shows an arrow between the non-GPU VM 442 being utilized by the second user 414 and a GPU VM 438 for which no users are directly logged in. This arrow reflects that the non-GPU VM 442 was instructed by the elastic GPU management module 404 to send its workload request to the GPU VM 438 for processing, as explained with respect to stages 214 and 216 of FIG. 2. The GPU VM 438 is shown being in use, meaning that the processing is ongoing. After completion, the GPU VM 438 can return results to the non-GPU VM 442 as explained with respect to stages 220 and 222 of FIG. 2. In this example, as a result of the use of this GPU VM 438, the elastic GPU management module 404 caused a new GPU VM to be added to the elastic GPU pool 420. In this example, the elastic GPU management module 404 can follow a rule provided in a profile that requires four GPU VMs to be available in the elastic GPU pool 420.

Figure 5:
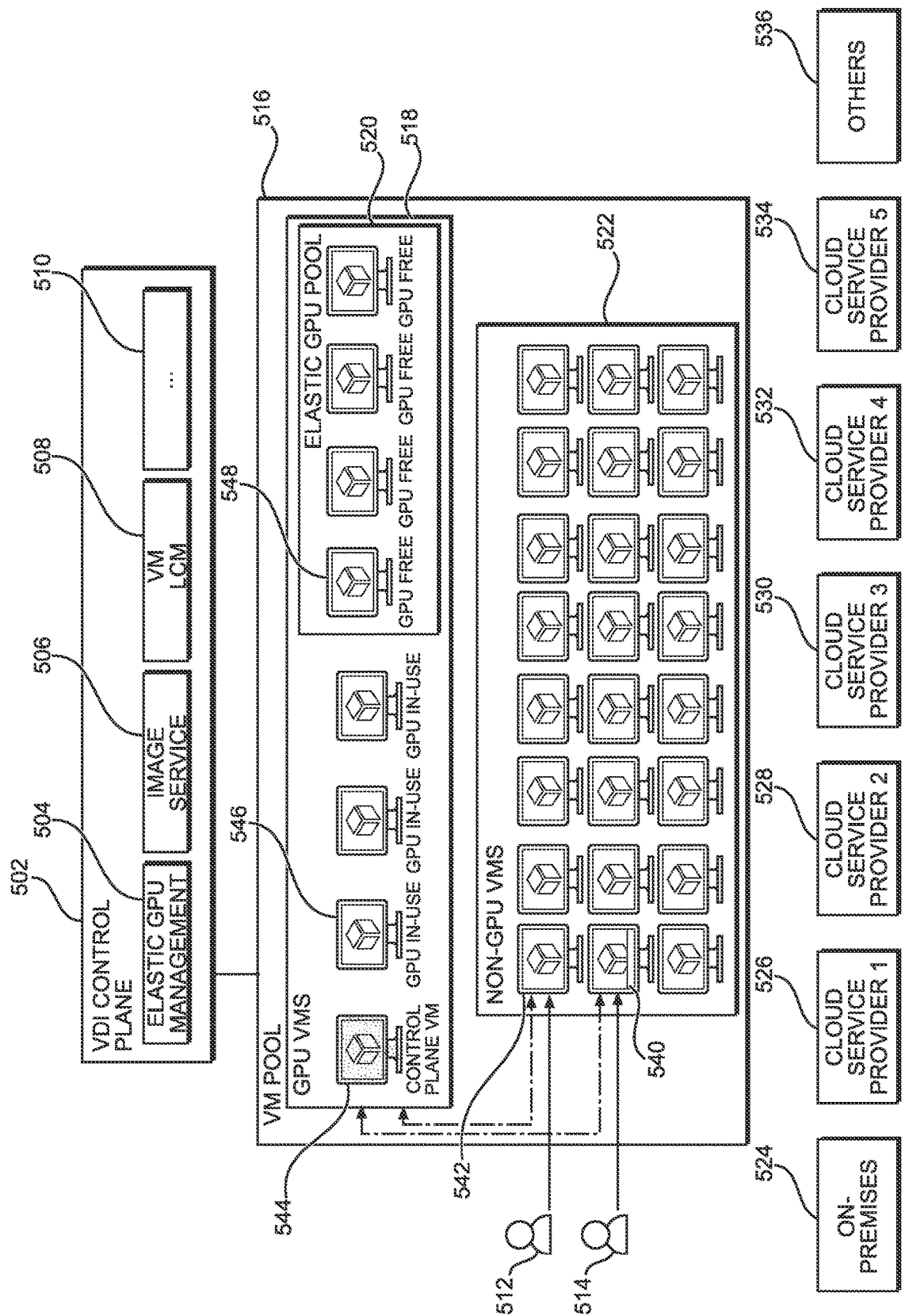
FIG. 5 is an illustration of an example system for dynamic VM provisioning across cloud service providers using a local control plane.

FIG. 5 provides an illustration of another example system for dynamic VM provisioning across cloud service providers using a local control plane. The system can include a VDI control plane 502 similar to the VDI control plane 402 of FIG. 4, with an elastic GPU management module 504, image service module 506, VM lifecycle management module 508, and other modules 510, similar to those (404, 406, 408, 510) described in FIG. 4. However, in this example, at least some of the functionality of the elastic GPU management module 504 is performed by a local control plane. In this example the local control plane resides on a control plane VM 544, which is shown as one of the VMs in the GPU VM pool 518.

As in the example system of FIG. 4, the system of FIG. 5 includes a VM pool 516 with a GPU VM pool 518 and a non-GPU VM pool 522. The VMs in the VM pool 516 can be provided by on-premises equipment 524, cloud service providers 526, 528, 530, 532, 534, or other providers 536. In this example, a first user 512 is logged into a first non-GPU VM 542 and a second user 514 is logged into a second non-GPU VM 540. In this example, both the first and second non-GPU VMs 542, 540 are in communication with the control plane VM 544. By way of example, the communications described with respect to stages 212 and 214 of FIG. 2 can be performed between either of the non-GPU VMs 542, 540 and the control plane VM 544.

In an example, the control plane VM 544 can identify an available GPU VM, such as a GPU VM 548 in the elastic GPU pool 520. The control plane VM 544 can then instruct either of the requesting non-GPU VMs 542, 540 to provide its workload request to that GPU VM 548. Similarly, the control plane VM 544 can instruct the remaining non-GPU VM 542, 540 to provide its workload request to another GPU VM in the elastic GPU pool 520. The instructions from the control plane VM 544 can be performed in accordance with the description of stage 214 of FIG. 2. Similarly, the GPU VMs can receive the workload request, perform the required processing, and return the results to the relevant non-GPU VM in accordance with the description of stages 216, 220, and 222 of FIG. 2.

The control plane VM 544 can select an available GPU VM using the same methods described with respect to the VDI control plane 402 in FIG. 4. That is, the control plane VM 544 can access a record of availability for each GPU VM to determine which GPU VMs are available for use. In another example, the control plane VM 544 can query each GPU VM to determine if it is currently in use. In this example, several GPU VMs, including GPU VM 546, are currently in use. For this reason, the control plane VM 544 can select a GPU VM 548 from the elastic GPU pool 520 after confirming that it is available for use.

In some examples, the control plane VM 544 can expand or shrink the elastic GPU pool 520 based on rules provided in a profile. In an example where four GPU VMs must be available in the elastic GPU pool 520, the control plane VM 544, and where one of those GPU VMs 548 takes on a workload request, the control plane VM 544 can cause an additional GPU VM to be instantiated and added to the elastic GPU pool 520. In an example, the control plane VM 544 makes this change by instructing the VDI control plane 502 to perform the relevant actions. In that example, the elastic GPU management module 504 can cause a new GPU VM to be instantiated while the image service module 506 provides an appropriate image to the new GPU VM. The elastic GPU management module 504 can then inform the control plane VM 544 that the new GPU VM is online. In some examples, the elastic GPU management module 504, image service module 506, and VM lifecycle management module 508 are located at the local control plane of the control plane VM 544.

Figure 6:
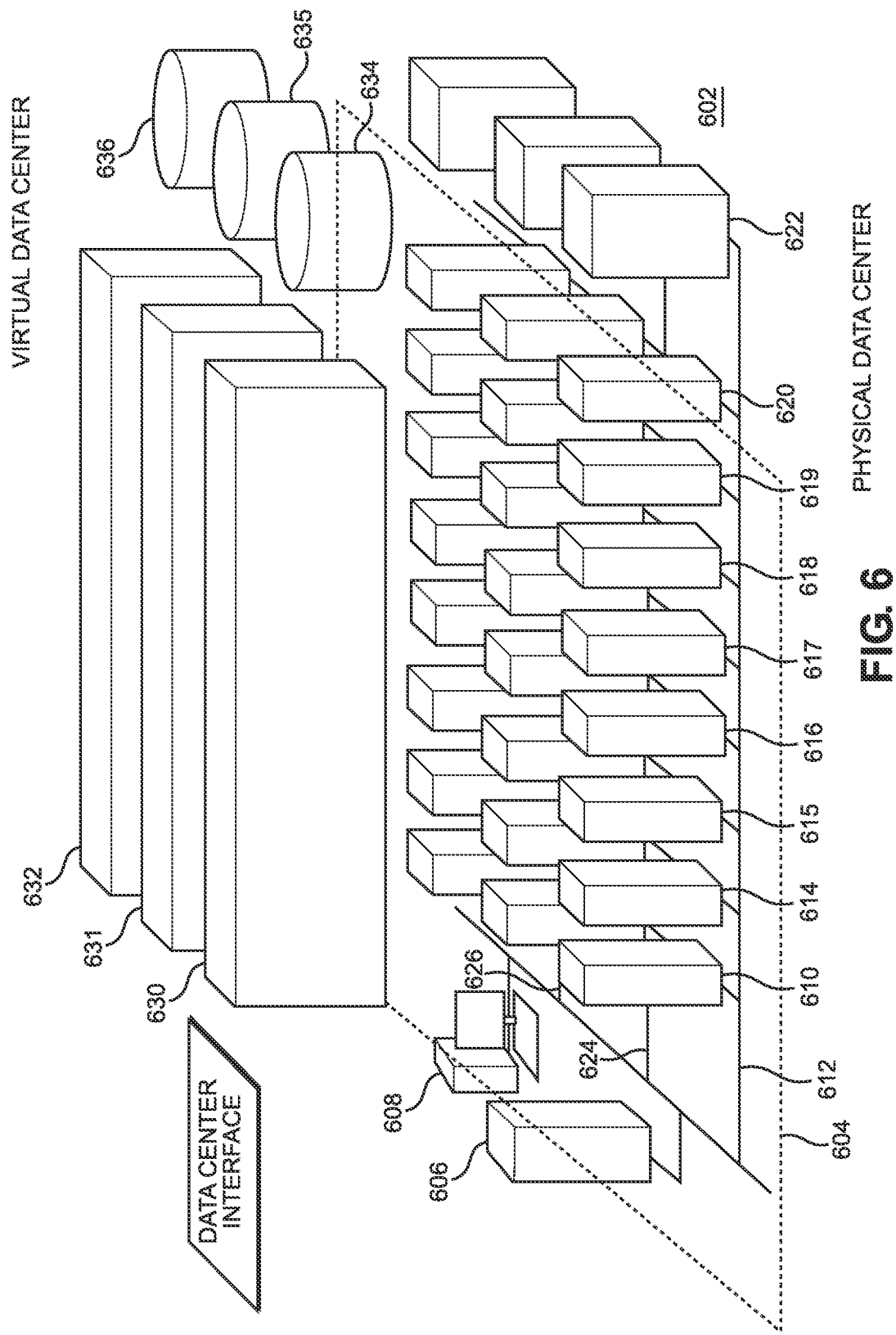
FIG. 6 is an illustration of an example software defined data center that can implement the various methods described herein.

FIG. 6 provides an illustration of a simplified SDDC that can perform the various methods described herein. Specifically, FIG. 6 illustrates a virtual data center provided as an abstraction of underlying physical-data-center hardware components. In some examples, the virtualized data center is considered an SDDC. The virtualized data center can include any or all of the various components described herein, such as the control plane, GPU VMs, and non-GPU VMs. In some examples, each cloud service provider can provide its own SDDC as depicted in FIG. 6. A physical data center 602 is shown below a virtual-interface plane 604. The physical data center consists of a virtual-infrastructure management server ("VI-management-server") 606 and any of various different computers, such as PCs 608, on which a virtual-data-center management interface can be displayed to system administrators and other users. The interface can be a software-based control system, such as VMWARE VCLOUD DIRECTOR.

The physical data center additionally includes a number of server computers, such as server computer 610, that are coupled together by local area networks, such as local area network 612 that directly interconnects server computer 610 and 614-620 and a mass-storage array 622. The physical data center shown in FIG. 6 includes three local area networks 612, 624, and 626 that each directly interconnects a bank of eight servers and a mass-storage array. The individual server computers, such as server computer 610, each includes a virtualization layer and runs multiple VMs. Different physical data centers can include many different types of computers, networks, data-storage systems and devices connected according to many different types of connection topologies. The virtual-data-center abstraction layer 604, a logical abstraction layer shown by a plane in FIG. 6, abstracts the physical data center to a virtual data center comprising one or more resource pools, such as resource pools 630-632, one or more virtual data stores, such as virtual data stores 634-636, and one or more virtual networks. In certain implementations, the resource pools abstract banks of physical servers directly interconnected by a local area network.

The virtual-data-center management interface allows provisioning and launching of VMs with respect to resource pools, virtual data stores, and virtual networks, so that virtual-data-center administrators need not be concerned with the identities of physical-data-center components used to execute particular VMs. Furthermore, the VI-management-server includes functionality to migrate running VMs from one physical server to another in order to optimally or near optimally manage resource allocation, provide fault tolerance, and high availability. It can migrate VMs to most effectively utilize underlying physical hardware resources, to replace VMs disabled by physical hardware problems and failures, and to ensure that multiple VMs supporting a high-availability virtual appliance are executing on multiple physical computer systems. This ensures the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the resources of individual physical servers and migrating VMs among physical servers to achieve load balancing, fault tolerance, and high availability.

The virtual data center provided by a service provider can be configured through a control system interface displayed on a user device, such as a computer or smartphone. In some examples, both the service provider and the tenants of that service provider can access certain configuration information through a GUI associated with the control system.

The SDDC of FIG. 6 can include multiple SDDC instances executing within the SDDC. For example, the SDDC can include an SDDC manager instance that operates on a standalone SDDC stack within the overall SDDC. Similarly, the SDDC can include an SDDC workflow instance that operates on another SDDC stack. The SDDC can include multiple SDDC manager instances and SDDC workflow instances, as described above.

Although examples described herein include systems and methods for dynamic VM provisioning across different cloud service providers, the same systems and methods can be applied for dynamic VM provisioning within a single cloud service provider. The examples or statements above relating to provisioning across cloud service providers are not intended to be limited regarding whether such provisioning is across different cloud service providers or within a single cloud service provider.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for dynamic virtual machine (VM) provisioning across cloud service providers, comprising:
   transmitting instructions across computer networks to hypervisors executing on computers of the cloud service providers to provide a VM pool that includes a first graphics processing unit (GPU)-optimized VM and a first non-GPU-optimized VM;
   receiving, at a control plane for the VM pool, an indication that a user of the first non-GPU-optimized VM has submitted a request through the first non-GPU-optimized VM, wherein the request specifies a workload;
   determining, by the control plane, that the first GPU-optimized VM is available for using a GPU to execute the workload, and issuing, by the control plane upon said determining, an instruction to the first non-GPU-optimized VM to send the workload to the first GPU-optimized VM; and
   transmitting an instruction across a computer network to a computer of one of the cloud service providers to instantiate a second GPU-optimized VM to increase the amount of GPU-optimized VMs of the VM pool that are available for using GPUs to execute workloads, to a minimum number.

2. The method of claim 1, further comprising:
   receiving, at the control plane, an indication that the workload has been completed by the first GPU-optimized VM using the GPU;
   determining that the first GPU-optimized VM is available for using GPUs to execute workloads; and
   causing at least one of the first and second GPU-optimized VMs to shut down based on instructions in a profile that indicate a maximum number of GPU-optimized VMs to be available for using GPUs to execute workloads.

3. The method of claim 1, wherein the request is received through a virtual desktop interface provided by the first non-GPU-optimized VM.

4. The method of claim 1, wherein the first non-GPU-optimized VM and the first GPU-optimized VM execute on computers of different cloud service providers.

5. The method of claim 1, wherein the first and second GPU-optimized VMs execute on computers of different cloud service providers.

6. The method of claim 1, wherein the control plane executes on a third GPU-optimized VM.

7. A non-transitory, computer-readable medium containing instructions that, when executed by a hardware-based processor, cause the processor to perform stages for dynamic virtual machine (VM) provisioning across cloud service providers, the stages comprising:
   transmitting instructions across computer networks to hypervisors executing on computers of the cloud service providers to provide a VM pool that includes a first graphics processing unit (GPU)-optimized VM and a first non-GPU-optimized VM;
   receiving, at a control plane for the VM pool, an indication that a user of the first non-GPU-optimized VM has submitted a request through the first non-GPU-optimized VM, wherein the request specifies a workload;
   determining, by the control plane, that the first GPU-optimized VM is available for using a GPU to execute the workload, and issuing, by the control plane upon said determining, an instruction to the first non-GPU-optimized VM to send the workload to the first GPU-optimized VM; and
   transmitting an instruction across a computer network to a computer of one of the cloud service providers to instantiate a second GPU-optimized VM to increase the amount of GPU-optimized VMs of the VM pool that are available for using GPUs to execute workloads, to a minimum number.

8. The non-transitory, computer-readable medium of claim 7, the stages further comprising:
   receiving, at the control plane, an indication that the workload has been completed by the first GPU-optimized VM using the GPU;
   determining that the first GPU-optimized VM is available for using GPUs to execute workloads; and
   causing at least one of the first and second GPU-optimized VMs to shut down based on instructions in a profile that indicate a maximum number of GPU-optimized VMs to be available for using GPUs to execute workloads.

9. The non-transitory, computer-readable medium of claim 7, wherein the request is received through a virtual desktop interface provided by the first non-GPU-optimized VM.

10. The non-transitory, computer-readable medium of claim 7, wherein the first non-GPU-optimized VM and the first GPU-optimized VM execute on computers of different cloud service providers.

11. The non-transitory, computer-readable medium of claim 7, wherein the first and second GPU-optimized VMs execute on computers of different cloud service providers.

12. The non-transitory, computer-readable medium of claim 7, wherein the control plane executes on a third GPU-optimized VM.

13. A system for dynamic virtual machine (VM) provisioning across cloud service providers, comprising:
   a memory storage comprising instructions; and
   a computing device including a hardware-based processor that is configured to execute the instructions from the memory storage to carry out stages comprising:

transmitting instructions across computer networks to hypervisors executing on computers of the cloud service providers to provide a VM pool that includes a first graphics processing unit (GPU)-optimized VM and a first non-GPU-optimized VM;

receiving, at a control plane for the VM pool, an indication that a user of the first non-GPU-optimized VM has submitted a request through the first non-GPU-optimized VM, wherein the request specifies a workload;

determining, by the control plane, that the first GPU-optimized VM is available for using a GPU to execute the workload, and issuing, by the control plane upon said determining, an instruction to the first non-GPU-optimized VM to send the workload to the first GPU-optimized VM; and transmitting an instruction across a computer network to a computer of one of the cloud service providers to instantiate a second GPU-optimized VM to increase the amount of GPU-optimized VMs of the VM pool that are available for using GPUs to execute workloads, to a minimum number.

14. The system of claim 13, the stages further comprising:
receiving, at the control plane, an indication that the workload has been completed by the first GPU-optimized VM using the GPU;
determining that the first GPU-optimized VM is available for using GPUs to execute workloads; and
causing at least one of the first and second GPU-optimized VMs to shut down based on instructions in a profile that indicate a maximum number of GPU-optimized VMs to be available for using GPUs to execute workloads.

15. The system of claim 13, wherein the request is received through a virtual desktop interface provided by the first non-GPU-optimized VM.

16. The system of claim 13, wherein the first non-GPU-optimized VM and the first GPU-optimized VM execute on computers of different cloud service providers.

17. The system of claim 13, wherein the first and second GPU-optimized VMs execute on computers of different cloud service providers.

18. The system of claim 13, wherein the control plane executes on a third GPU-optimized VM.

* * * * *